(12) United States Patent
Ripper et al.

(10) Patent No.: US 7,654,080 B2
(45) Date of Patent: Feb. 2, 2010

(54) METERING SYSTEM AND METHOD FOR OPERATING A METERING SYSTEM

(75) Inventors: Wolfgang Ripper, Stuttgart (DE);
Markus Buerglin, Ditzingen (DE);
Thorsten Mayer, Worms (DE); Michael Offenhuber, Adnet (AT); Dirk Heilig, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 11/667,310

(22) PCT Filed: Sep. 16, 2005

(86) PCT No.: PCT/EP2005/054606

§ 371 (c)(1),
(2), (4) Date: May 9, 2007

(87) PCT Pub. No.: WO2006/051017

PCT Pub. Date: May 18, 2006

(65) Prior Publication Data

US 2007/0283685 A1    Dec. 13, 2007

(30) Foreign Application Priority Data

Nov. 10, 2004   (DE) .................. 10 2004 054 238

(51) Int. Cl.
*F01N 3/00*   (2006.01)
(52) U.S. Cl. .................. 60/286; 60/274; 60/295; 60/301; 60/303; 239/410; 239/411; 239/533.13
(58) Field of Classification Search .............. 60/274, 60/286, 295, 297, 301, 303; 239/410, 411, 239/416.4, 533.11, 533.13
See application file for complete search history.

(56) References Cited

U.S. PATENT DOCUMENTS

| 5,809,774 | A | * | 9/1998 | Peter-Hoblyn et al. | ......... 60/274 |
| 5,884,475 | A | * | 3/1999 | Hofmann et al. | ............... 60/274 |
| 6,063,350 | A | * | 5/2000 | Tarabulski et al. | ........ 423/239.1 |
| 7,017,335 | B2 | * | 3/2006 | Huber et al. | ................... 60/286 |
| 7,100,366 | B2 | * | 9/2006 | Hager et al. | ................... 60/286 |
| 2006/0117741 | A1 | * | 6/2006 | Mayer et al. | ................... 60/286 |

FOREIGN PATENT DOCUMENTS

| DE | 102 54 981 A1 | 6/2004 |
| WO | WO 96/08639 A1 | 3/1996 |
| WO | WO 00/21881 A1 | 4/2000 |

* cited by examiner

*Primary Examiner*—Binh Q. Tran
(74) *Attorney, Agent, or Firm*—Ronald E. Greigg

(57) ABSTRACT

The invention relates to a dosing system comprising a dosing means for metering a liquid, especially an aqueous urea solution used for the aftertreatment of exhaust gases generated by combustion engines. The liquid can be conveyed from a reservoir into an exhaust manifold through the dosing means in a normally operating conveying device. According to the invention, at least one area that is located between a dosing point and the reservoir and is impinged upon by the liquid can be emptied counter to a normal transport direction of the liquid.

18 Claims, 2 Drawing Sheets

METERING SYSTEM AND METHOD FOR OPERATING A METERING SYSTEM

CROSS-REFERENCE TO RELATED APPLICATION

This application is a 35 USC 371 application of PCT/EP 2005/054606 filed on Sep. 16, 2005.

BACKGROUND OF THE INVENTION

1. Field of the Invention

The invention is directed to an improved metering system and to a method for operating the metering system, for metering a treatment liquid into an exhaust gas from an internal combustion engine.

2. Description of the Prior Art

To reduce the nitrogen oxides contained in an exhaust gas of an internal combustion engine, for those engines that are operated with air excess, a method for selective catalytic reduction has proved advantageous. In this method, the nitrogen oxides are converted together with ammonia into nitrogen and water in a selective catalytic converter. The reducing agent, required for the catalytic conversion of the nitrogen oxides, is carried along instead of ammonia in the vehicle, in the form of an aqueous urea solution from which the ammonia can be released by hydrolysis of the urea solution in whatever amount is needed for the conversion. It is known to inject the urea solution into an exhaust manifold downstream of a mixing chamber, by means of an aerosol formation that occurs in the mixing chamber. The alternative of metering the urea solution directly into the exhaust gas without air reinforcement is also known. In each case, it is problematic that depending on the urea concentration, there is the risk that the aqueous urea solution will freeze at certain temperatures. The expansion behavior of the urea solution is similar to that of water. If the freezing urea solution is unable to expand, impermissibly high pressures can occur in the interior of components that are filled with the urea solution, and this can lead to the destruction of the components. To avoid this, it is known to provide walls that at least partially yield under pressure in the work chamber of a metering valve, or to provide elements there that can compensate reversibly for a pressure in the work chamber that occurs when ice forms. It is also known to use metering pumps instead of metering valves for metering the urea solution.

SUMMARY AND ADVANTAGES OF THE INVENTION

A metering system is proposed, having a metering means for metering a liquid, in particular for metering an aqueous urea solution for posttreatment of exhaust gases from internal combustion engines, in which the liquid can be fed into an exhaust manifold from a tank in a normal-operation feeding direction by the metering means; at least one region, acted upon by the liquid, between a metering point and the tank can be evacuated in the opposite direction from a normal-operation feeding direction of the liquid. Damage to the metering means or the metering system from unwanted ice formation at low outdoor temperatures, and in particular a buildup of excessive ice pressures in the apparatus, is reliably avoided. Moreover, if a thermal preparation unit is present for the liquid, unwanted re-evaporation or crystallization out of one or more components of the liquid can be avoided if the liquid can be removed, in certain operating states, from the hot zone of the preparation unit.

Preferably, the metering system has a metering valve for metering a liquid, and the region to be evacuated between a feed pump and the metering valve can be evacuated in the opposite direction from the normal-operation feeding direction. In the normal mode of operation, the feed pump feeds the liquid in a feeding direction from a tank to the metering valve. In the metering valve arrangement, the urea solution is metered directly into the exhaust manifold, without aerosol formation. Damage to the metering valve from unwanted ice formation at low outdoor temperatures, and in particular a buildup of excessive ice pressures in the arrangement, is reliably avoided.

Advantageously, the feed pump is embodied with a reversible feeding direction, so that an existing component in the arrangement can be used for evacuating the arrangement, and no additional structural space is needed. To that end, the direction of rotation of the feed pump can be reversed. The feeding direction can also be reversed with suitable valves, such as 4/2-way valves. By the use of such valves, diaphragm pumps, for instance, can also be used as feed pumps. The liquid can then be returned to a tank, which reduces both the consumption of the liquid and environmental pollution, since in the evacuation, only little of the liquid, or none, is released to the outside.

Preferably, a ventilation valve is provided upstream of the metering valve in terms of the normal-operation feeding direction. Upon evacuation, means are provided for opening the ventilation valve. The gas flow through the ventilation valve prevents exhaust gases and particles from being aspirated into the metering valve arrangement and instead delivers a clean gas, such as fresh air, while the aqueous urea solution is removed from the arrangement and delivered to a tank, for instance. Expediently, the metering valve can be closed relative to the exhaust gas system for evacuation. Expediently, the ventilation valve is located as close as possible to the metering valve.

The metering valve is especially advantageously actuated in pulse width modulated fashion. Preferably, the metering valve is closed when without current. When the vehicle has been shut off, the arrangement is protected against contamination and soiling upstream of the metering valve without further effort or expense.

In a preferred refinement, the metering means includes a metering pump with which the liquid can be fed to the exhaust manifold. The metering pump makes a precisely defined amount of the liquid available to the exhaust manifold. This amount can be injected directly or, particularly when it is delivered in the form of liquid, it can first be prepared via a preparation unit and then delivered for instance as steam to the exhaust manifold. Preferably, the metering pump is embodied as a peristaltic pump. This is a volumetric feeding device. By means of rollers running in a cylinder, a certain volume is trapped in a hose continuously with an increasing angle of rotation and fed. An exhaust gas counterpressure and a pressure that possibly occurs upon evaporation in a preparation unit can be reliably generated on this principle. The pump is also self-aspirating and can feed counter to the normal-operation feeding direction, for instance by reversal of its direction of rotation. Thus upon shutoff of the metering system or of the vehicle, the liquid can be removed from the hot region of the preparation unit. Also, the entire system can be pumped empty in reverse, for instance as far as the tank, in order to enhance its capability for winter operation. With peristaltic pumps, a liquid can be metered extremely precisely by being fed continuously or discontinuously via a drive mechanism, such as an electric stepping motor. The metered amount can be quantified precisely by means of the angle of rotation or the number of steps.

Preferably, the metering pump has a reversible direction of rotation. Thus the region to be evacuated can be evacuated without further components. Alternatively or in addition, to reverse the feeding direction of the metering pump, at least one valve may be provided, which given suitable switching diverts the liquid counter to the normal-operation feeding direction.

If a preparation unit for preparing the liquid is disposed between the metering pump and the exhaust manifold, the metered amount of liquid can be prepared and in particular evaporated. The preparation unit is preferably a heated reactor that can preferably be heated electrically. The preparation unit may be operated in such a way that an amount of liquid to be metered at that time can be added continuously or discontinuously, depending on the metering strategy, and then prepared quickly and as completely as possible into gaseous components. In the case of an aqueous urea solution, which is preferred, ammonia, water vapor, and carbon dioxide then form. The gaseous components conduct themselves automatically, because of the volumetric increase occurring at the phase transition, and in particular because of the high proportion of water vapor, into the exhaust manifold and can be distributed homogeneously in the exhaust gas relatively unproblematically. The ammonia formation performed externally by the exhaust manifold and generated as needed makes it possible, because of the operation of the preparation unit that is independent of the exhaust gas temperature, to improve the nitrogen oxide conversion rate. This is especially advantageous for vehicles that have relatively low exhaust gas temperatures.

Expediently, the region to be evacuated is disposed between the metering pump and the exhaust manifold. Freezing of the liquid, or crystallization out of one or more components of the liquid, and resultant damage to the region can be avoided. If the metering pump is embodied as a peristaltic pump, an uncontrolled preparation of the liquid by re-evaporation can be avoided. The operating safety can be enhanced. As a hose pump, the peristaltic pump is capable of winter operation, since the flexible hose material can tolerate ice formation. In principle, however, any other metering pump whose feeding direction is reversible is also suitable.

It is especially favorable to provide a porous body, which reinforces preparation of the liquid, in or at the exhaust manifold. The body may be heatable with a heating element, for instance. It is advantageous to design the body as catalytically active, to further improve the preparation. Favorably, the metal is formed from metal foam, for instance comprising high-grade steel, aluminum, and the like, and/or from ceramic.

By the method of the invention for operating a metering system for metering a liquid, in particular for metering an aqueous urea solution for posttreatment of exhaust gases from internal combustion engines, in which the liquid is fed in a feeding direction to a metering means and metered into an exhaust manifold, from time to time, at least one region between a metering point and the tank is evacuated counter to the normal-operation feeding direction. The method is reliable and process-safe.

Preferably, for evacuating a preferred metering valve, the feeding direction is reversed, either by a reversal of the direction of rotation of a feed pump or by suitable valves, preferably 4/2-way valves. With a reversal of the direction of rotation of the feed pump, economy in terms of structural space can be attained, since an existing feed pump can also be used for evacuating the metering valve. Optionally, however, a second pump may also be provided for evacuating the region or the metering valve. To avoid contamination of the metering valve and feed lines upstream of it, the metering valve is expediently closed off from the exhaust manifold for evacuation.

Preferably, during the evacuation, gas and in particular air is aspirated via a ventilation valve located between the feed pump and the metering valve. It can thus be prevented that particles and contamination from the exhaust manifold, particularly from a catalytic converter arrangement, will be aspirated.

If after the evacuation the metering valve is opened toward the exhaust manifold, a slight amount of fluid located in the metering valve may be evacuated into the exhaust manifold. If in the installed position the metering valve is located below the exhaust manifold, then the slight amount of liquid in the metering valve can be evacuated into its supply line for the liquid. Because the amount is slight, it can expand upon freezing without damaging the supply line.

For evacuation of the region to be evacuated, a metering pump whose feeding direction can be reversed can also be used. Its direction of rotation may be reversed, and/or at least one valve may be used which given a suitable design allows a flow through it in one direction or the opposite direction, depending on the valve position.

It is understood that the embodiments may be combined with one another, which makes a mode of operation of the metering system possible that is adapted to what is needed.

BRIEF DESCRIPTION OF THE DRAWINGS

Further embodiments, aspects and advantages of the invention will become apparent from the exemplary embodiments of the invention described below in conjunction with a drawings, in which.

DESCRIPTION OF THE PREFERRED EMBODIMENTS

Figure 1:
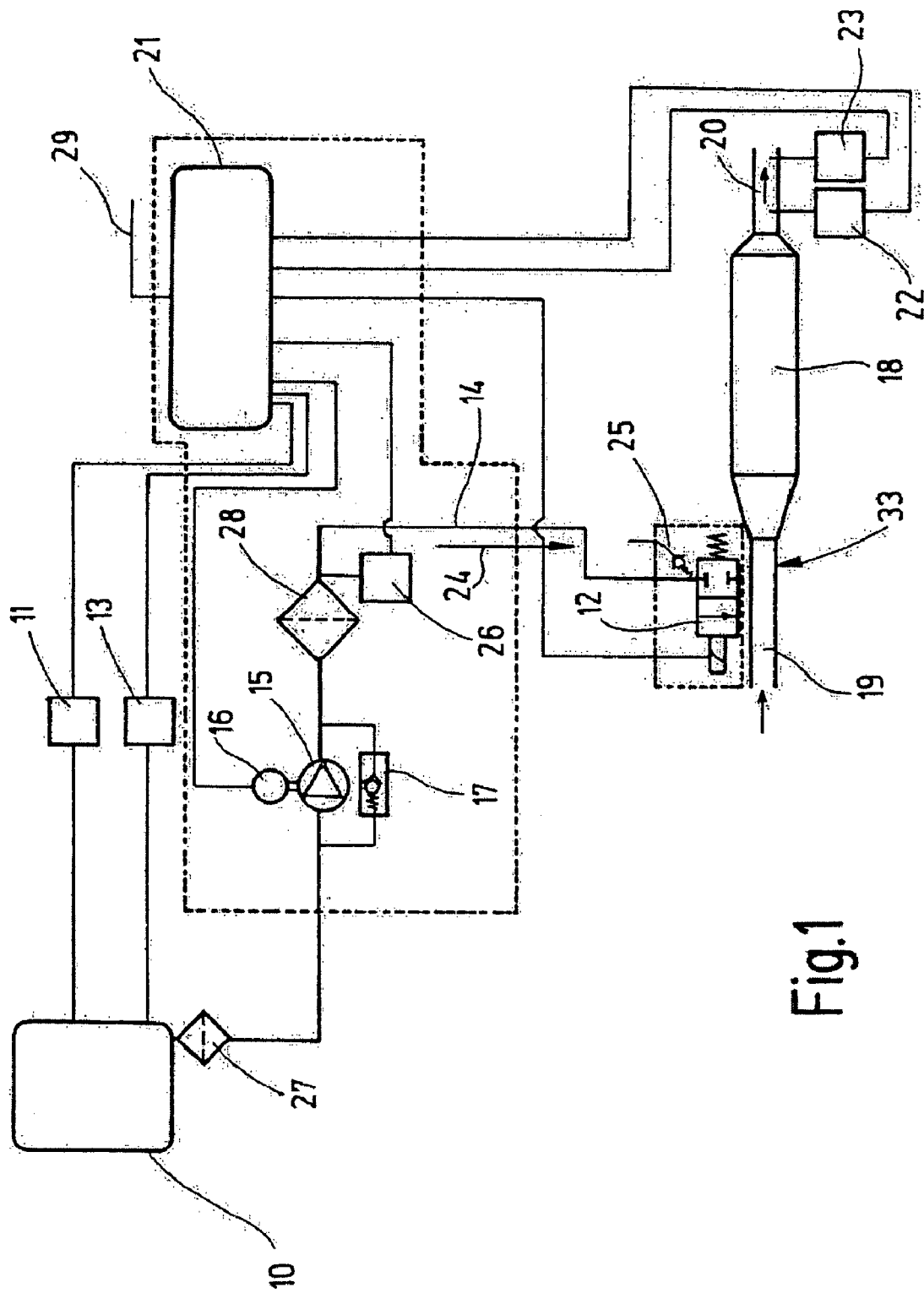
FIG. 1 is a schematic illustration of a preferred metering valve arrangement in an exhaust manifold of a motor vehicle.

A preferred metering system is shown in simplified form in FIG. 1. In a tank 10, an aqueous urea solution is stored as a reducing agent for exhaust gas posttreatment for cleaning an exhaust gas of an internal combustion engine of a vehicle; this solution can be introduced into a metering valve 12 via a feed pump 15 and a line, not identified by reference numeral, as well as a prefilter 27. In the prefilter 27, the urea solution is roughly cleaned. The feed pump 15 can be circumvented by a bypass valve 17, which opens if the pressure in a normal-operation feeding direction 24 downstream of the feed pump 15 is too high. The feed pump 15 pumps the aqueous urea solution in the normal-operation feeding direction 24, identified by an arrow, to the metering valve 12, which meters the urea solution directly, without air reinforcement for aerosol formation, into an exhaust manifold. Downstream of the feed pump 15, there is a filter 28, with which the urea solution is cleaned before it reaches the metering valve 12. Downstream of the filter 28, there is a sensor 26 for determining the temperature of the urea solution; this sensor is connected to an engine control unit 21 via a signal line not identified by reference numeral.

For exhaust gas cleaning, the urea solution is introduced at a metering point 33 into an exhaust gas inlet region 19 of a catalytic converter 18. An exhaust gas flow direction in the exhaust gas inlet region 19 and in the exhaust gas outlet region 20 is indicated by arrows in each case. In the exhaust gas outlet region 20, typical sensors 22 and 23 are provided, such as pressure sensors, temperature sensors, lambda sensors, NOx sensors, and the like, which communicate with the control unit 21 via signal lines, not identified by reference numeral, and are components of a conventional exhaust gas posttreatment. The control unit 21 also triggers the metering valve 12 and the feed pump 15, or its drive motor 16, as a function of operating parameters and/or operating states, via signal lines, not identified by the reference numeral. The control unit 21 also communicates with the engine of the vehicle via a CAN bus 29. Sensors 11 and 13 for measuring the fill level and the tank temperature are provided on the tank 10 and communicate with the control unit 21 by means of data lines, not identified by reference numeral. The metering valve 12 can preferably be operated in pulse width modulated fashion.

In a preferred feature of the invention, upon shutoff of the vehicle engine, the metering valve 12 or a region 14 of a feed line between the feed pump 15 and the metering valve 12 can be evacuated in the opposite direction from the normal-operation feeding direction 24; the feeding direction of the feed pump 15 is reversed, and the urea solution is returned to the tank 10 counter to the normal-operation feeding direction 24 that is usual during operation. A ventilation valve 25 located upstream of the metering valve 12 is opened and the metering valve 12 is closed. By means of a gas flow, for instance by supplying fresh air, through the ventilation valve 25 an aspiration of exhaust gas and particles from the catalytic converter 18 and the exhaust gas inlet region 19 is avoided. Optionally, a second pump may also be provided, for pumping the urea solution out of the region 14 of the feed line. Once the region 14 has been evacuated, the metering valve 12 can be opened toward the exhaust manifold, so as to evacuate a slight residual amount of the urea solution from the metering valve 12 itself. If in the installed position the metering valve 12 is located above the exhaust manifold, as shown, then this slight residual amount can be dispensed into the exhaust manifold 19. If the metering valve 12 is located below the catalytic converter 18 in the installed position (not shown), then the slight residual amount can be dispensed into the region 14 of the feed line; in this case, this region is located at least adjacent to the metering valve 12, below the exhaust manifold.

Figure 2:
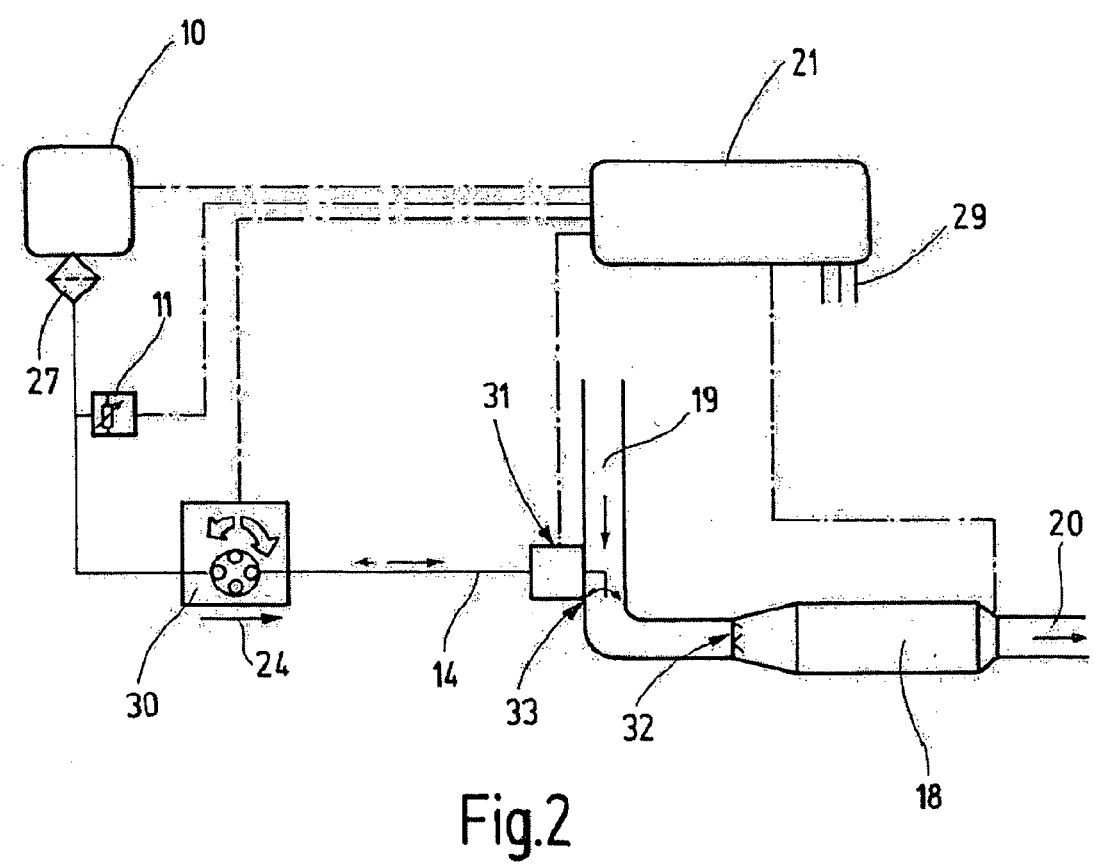
FIG. 2 is a schematic showing of a preferred metering pump arrangement in an exhaust manifold of a motor vehicle.

A further preferred feature of the metering system is shown in FIG. 2. An aqueous urea solution, as a reducing agent for exhaust gas posttreatment for cleaning an exhaust gas of an internal combustion engine of a vehicle, is stored in a tank 10 and can be fed, via a prefilter 27 and a metering pump 30 embodied as a peristaltic pump as well as a line not identified by reference numeral, to a metering point 33 of an exhaust manifold. In the prefilter 27, the urea solution is roughly cleaned. The metering pump 30 pumps the aqueous urea solution in the normal-operation feeding direction 24, identified by an arrow, to the metering point 33. Upstream of the metering point 33, adjacent to the exhaust manifold, there is a preparation unit 31 embodied as a thermal reactor, in which the urea solution is evaporated and metered directly into the exhaust manifold.

For exhaust gas cleaning, the urea solution is introduced at the metering point 33 into an exhaust gas inlet region 19 of a catalytic converter 18. For better mixing with the exhaust gas, a static mixer 32 is provided downstream of the metering point 33. Respective arrows indicate an exhaust gas flow direction in the exhaust gas inlet region 19 and in the exhaust gas outlet region 20. In the exhaust gas outlet region 20, typical sensors, not shown in the drawing, may be provided, such as pressure sensors, temperature sensors, lambda sensors, NOx sensors, and the like, which communicate by means of a signal line, not identified by reference numeral, with the control unit 21 and are part of a conventional exhaust gas posttreatment. The control unit 21 furthermore triggers the metering pump 30, via signal lines not identified by reference numeral, as a function of operating parameters and/or operating states. The control unit 21 also communicates with the engine of the vehicle via a CAN bus 29. Sensors 11 and 13 for measuring the fill level and the tank temperature are provided on the tank 10 and communicate with the control unit 21 by means of data lines, not identified by reference numeral.

In a preferred feature of the invention, upon shutoff of the vehicle engine, the metering pump 30 or at least one region 14 of a feed line between the metering pump 30 and the metering point 33 can be evacuated in the opposite direction from the normal-operation feeding direction 24; the feeding direction of the metering pump 30 is reversed, and the urea solution is returned to the tank 10 counter to the normal-operation feeding direction 24 that is usual during operation.

The foregoing relates to a preferred exemplary embodiment of the invention, it being understood that other variants and embodiments thereof are possible within the spirit and scope of the invention, the latter being defined by the appended claims.

The invention claimed is:

1. A metering system having a metering means for metering an aqueous urea solution for posttreatment of exhaust gases from internal combustion engines, the metering means comprising a pump for feeding the solution from a tank in a normal-operation feeding direction into an exhaust manifold at a metering point, and at least one region, acted upon by the liquid, between the metering point and the pump, the at least one region being capable of being emptied of the solution in an opposite direction from the normal-operation feeding direction of the solution, the conveying direction of the pump being reversible, so that, with the conveying direction reversed, the at least one region can be emptied, and a suction intake of a gas takes place in a region of the metering point.

2. The metering system as defined by claim 1, wherein the metering means further comprises a metering valve for metering the liquid directly into the exhaust manifold in a normal-operation feeding direction, the region acted upon by the liquid and to be evacuated being disposed between the pump and the metering valve.

3. The metering system as defined by claim 2, wherein the pump is embodied with a reversible feeding direction.

4. The metering system as defined by claim 2, further comprising at least one valve operable to reverse the feeding direction.

5. The metering system as defined by claim 2, further comprising a ventilation valve upstream of the metering valve in terms of the normal-operation feeding direction, the ventilation valve being openable upon evacuation of the metering valve.

6. The metering system as defined by claim 2, wherein the metering valve is actuatable in pulse width modulated fashion.

7. The metering system as defined by claim 1, wherein the pump comprises a metering pump.

8. The metering system as defined by claim 7, wherein the metering pump is a peristaltic pump.

9. The metering system as defined by claim 7, wherein the metering pump has a reversible direction of rotation.

10. The metering system as defined by claim 8, wherein the metering pump has a reversible direction of rotation.

11. The metering system as defined by claim 7, further comprising at least one valve to reverse the feeding direction of the metering pump.

12. The metering system as defined by claim 7, further comprising a preparation unit for preparing the liquid connected between the metering pump and the exhaust manifold.

13. The metering system as defined by claim 7, wherein the at least one region to be evacuated is disposed between the metering pump and the exhaust manifold.

14. A method for operating a metering system having a metering means for metering an aqueous urea solution for posttreatment of exhaust gases from internal combustion engines, the metering means comprising a pump for feeding the solution from a tank in a normal-operation feeding direction into an exhaust manifold at a metering point, and at least one region, acted upon by the liquid, between the metering point and the pump, the method comprising the step of reversing the conveying direction of the pump to induce a gas flow in the at least one region in a direction opposite to the normal-operation feeding direction, so that, with the conveying direction reversed, the at least one region can be emptied of the solution and a suction intake of a gas takes place in the region of the metering point.

15. The method according to claim 14, wherein the metering means further comprises a metering valve and the solution is conveyed, in the normal-operation conveying direction, through the metering valve directly into the exhaust manifold, and wherein the at least one region acted upon by the solution and to be emptied is arranged between the pump and the metering valve.

16. The method according to claim 15, wherein, during the emptying of the at least one region, the metering valve is closed.

17. The method according to claim 15, wherein after the emptying of the at least one region, the metering valve is opened towards the exhaust manifold.

18. The method according to claim 16, wherein after the emptying of the at least one region, the metering valve is opened towards the exhaust manifold.

* * * * *